United States Patent
Singhi et al.

(10) Patent No.: US 10,958,446 B2
(45) Date of Patent: Mar. 23, 2021

(54) SECURE WIRELESS NETWORK ASSOCIATION

(71) Applicant: Intel Corporation, Santa Clara, CA (US)

(72) Inventors: Ashish Singhi, Hillsboro, OR (US); Royce Fernald, Portland, OR (US); Farid Adrangi, Lake Oswego, OR (US); Abhijeet Kolekar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 404 days.

(21) Appl. No.: 15/868,198

(22) Filed: Jan. 11, 2018

(65) Prior Publication Data
US 2019/0044737 A1    Feb. 7, 2019

(51) Int. Cl.
| H04L 9/32 | (2006.01) |
| H04W 12/04 | (2009.01) |
| H04L 9/08 | (2006.01) |
| H04L 29/06 | (2006.01) |
| H04W 12/06 | (2009.01) |

(52) U.S. Cl.
CPC .......... *H04L 9/3263* (2013.01); *H04L 9/0825* (2013.01); *H04L 9/321* (2013.01); *H04L 9/3273* (2013.01); *H04L 63/061* (2013.01); *H04L 63/0823* (2013.01); *H04W 12/04* (2013.01); *H04W 12/06* (2013.01); *H04L 2209/80* (2013.01)

(58) Field of Classification Search
CPC ............... H04L 2209/80; H04L 63/061; H04L 63/0823; H04L 9/0825; H04L 9/321; H04L 9/3263; H04L 9/3273; H04L 12/46; H04W 12/04; H04W 12/06; H04W 36/36; H04W 48/14; H04W 84/12
See application file for complete search history.

(56) References Cited

U.S. PATENT DOCUMENTS

| 7,376,398 | B2* | 5/2008 | Roy ...................... | H04B 7/0408 455/101 |
| 2009/0046633 | A1* | 2/2009 | Thomson .............. | H04W 12/06 370/328 |
| 2009/0109897 | A1* | 4/2009 | Woo .................... | H04W 12/003 370/328 |
| 2013/0188628 | A1* | 7/2013 | Lee ........................ | H04W 48/14 370/338 |
| 2017/0310485 | A1* | 10/2017 | Robbins ................... | H04L 9/14 |

* cited by examiner

*Primary Examiner* — Abiy Getachew
(74) *Attorney, Agent, or Firm* — Schwegman Lundberg & Woessner, P.A.

(57) ABSTRACT

System and techniques for secure wireless association are described herein. A station (STA) may transmit a probe request for the wireless network that includes identification of a certificate. An access point (AP) receiving the probe request may obtain the identified certificate and use the certificate to encrypt a key. The encrypted key may then be included in a beacon by the AP. The STA may then obtain the encrypted key from the beacon, decrypt the key with the certificate, and then use the key to associate to the wireless network via the AP.

16 Claims, 10 Drawing Sheets

FIG. 3

| FIELD | WPS VENDOR ATTRIBUTE ID | LENGTH | CODE | OUI | DEVICE ID | NONCE1 |
|---|---|---|---|---|---|---|
| VALUE | 0X10 DEVICE PROVISIONING | 40 | 1 (NEED PROVISION) | 0X00-17-35-20 | WWW URL DEVICE ID | RANDOM NUMBER |
| OCTETS | 2 | 2 | 2 | 4 | 32 | 2 |

FIG. 4

| FIELD | WPS VENDOR ATTRIBUTE ID | LENGTH | CODE | OUI | DEVICE ID | NONCE1 | WPS PROFILE |
|---|---|---|---|---|---|---|---|
| VALUE | 0X10 DEVICE PROVISIONING | 40 | 2 (PROVISIONING RESPONSE) | 0X00-17-35-20 | ID FOR THE DEVICE | RANDOM NUMBER ENCRYPTED USING DEVICE CERTIFICATE | WPS KEY ENCRYPTED USING DEVICE CERTIFICATE |
| OCTETS | 2 | 2 | 2 | 4 | 6 | 2 | 128 |

SECURE WIRELESS NETWORK ASSOCIATION

TECHNICAL FIELD

Embodiments described herein generally relate to wireless networking and more specifically to secure wireless network association.

BACKGROUND

The internet-of-things (IoT) refers to devices and communication networks to connect a multitude of devices, many of which were previously unconnected. Examples may include sensor arrays, control systems, appliances, building automation systems, among others. The Open Connectivity Foundation (OCF) is a standards body promulgating communications protocols to facilitate a variety of IoT deployments. The OCF family of standards defines application layer communication endpoints, object (e.g., data) definitions, discovery and security procedures to allow the exchange of data between IoT devices and services.

A variety of techniques may be used to provide the physical layer connectivity of IoT deployments. Although wired techniques, such as Ethernet, are possible, IoT deployments generally employ wireless technologies to ease deployment placements and costs. An example wireless technology used in some IoT deployments operates in accordance with a standard from the IEEE 802.11 family of standards (e.g., wireless local area network (WLAN)). A variety of security techniques for WLAN networks have been developed, such as the Wi-Fi protected setup (WPS) family of standards. WPS, and related technologies, generally provide authentication and data security (e.g., encryption) at the physical layer for establishing network connectivity. Thus, generally, an IoT device will be provisioned on the physical layer and then be provisioned in the application layers before the IoT device participates in IoT system deployments.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a probe message, according to an embodiment.

FIG. 4 illustrates an example of a beacon message, according to an embodiment.

DETAILED DESCRIPTION

Figure 1:
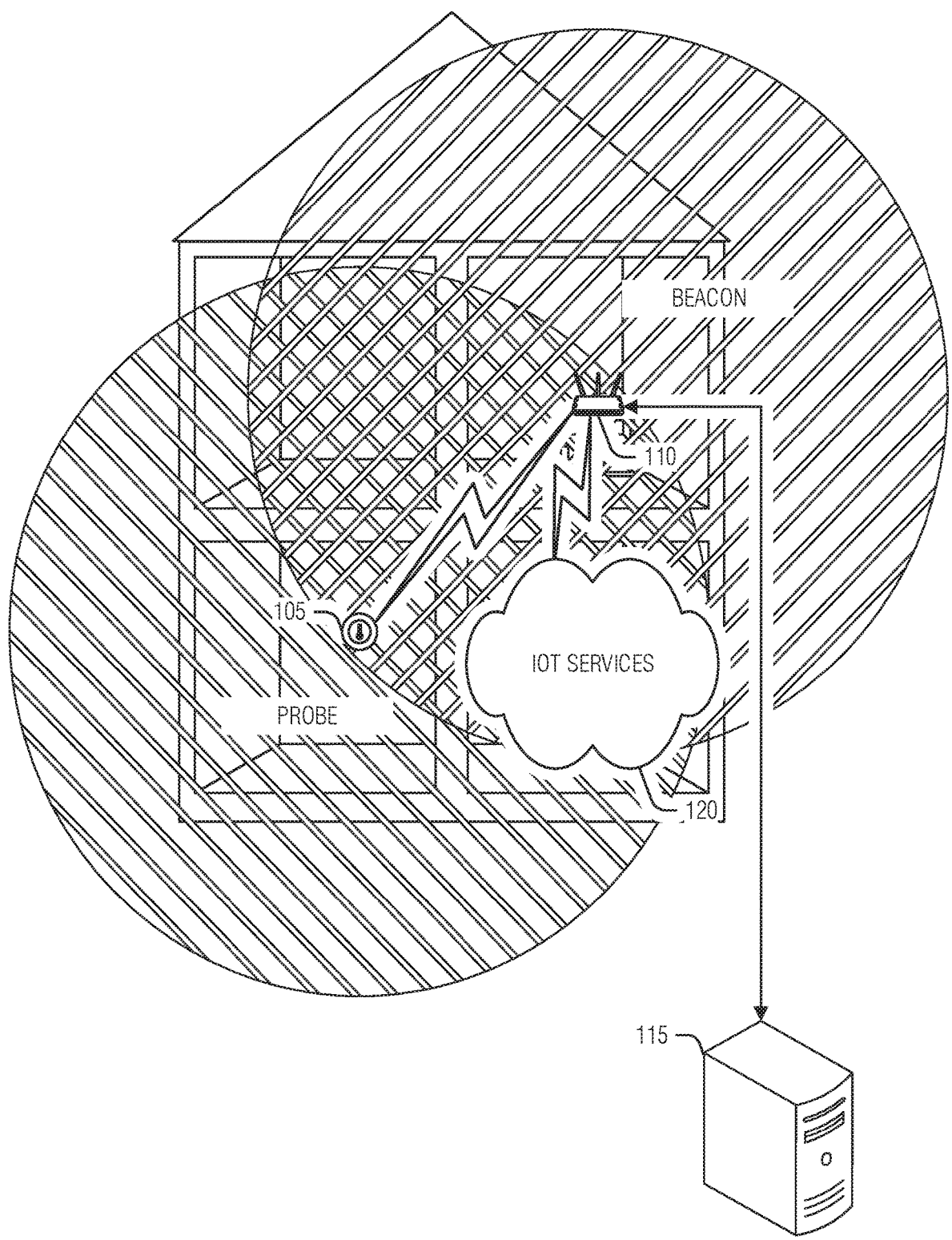
FIG. 1 is a block diagram of an example of an environment including a system for secure wireless association, according to an embodiment.

The IoT ecosystem is evolving. Home and industrial deployments include increasingly many devices connected through gateways to effect IoT systems. It is expected that fifty billion devices (e.g., processing devices, sensors, storage, etc.) will connect to the Internet by 2020. Generally, home and industrial gateways provide the underlying connectivity that provides IoT deployments with their value.

Easy installation and onboarding of IoT devices may be difficult due to the large numbers of devices in many modern deployments because each device installation often involves human intervention in several steps to configure the devices. Onboarding WLAN Devices (e.g., stations or STAs) may involve a smartphone (or other portable terminal) to connect with a device (e.g., via a wired tether or wireless connection such as IEEE 802.15.1) to configure the device to connect to a WLAN access point (AP). However, for system installers or administrators, it is not feasible to have humans visit and configure each device with network credentials, identification (IDs), security certificates, etc. Some technologies, such as Intel Secure Device Onboarding, address IoT service security including onboarding, but do not address access to the underlying network. Thus, for these "easy onboarding" techniques, the IoT device being provisioned must already be on, or provisioned, for the network before the IoT onboarding may begin.

If network security is relaxed to allow more automatic connectivity—in which device provisioning at the upper OCF layer may occur—a malicious entity may install a malicious IoT Device to access the WLAN, endangering the entire network. A malicious device, once entered into the network, may introduce replay attacks or false data to centralized processing server. A fake (e.g., unauthorized) device may inject false information into a system to cause unwanted responses and which may lead to mask a physical attack. Falsely injected data, or other mischief, may impact the reliability of IoT deployments.

To address the network onboarding issues discussed above, a modified WLAN probe and beacon technique replaces traditional IoT device configuration to access the network. A STA includes a certificate indication, such as a uniform resource identifier (URI) (including, as an example, a uniform resource locator (URL)) into a probe request. The AP, upon receiving the probe request, uses the certificate URI to locate the STA's certificate at another device, such as a certificate authority. Upon retrieving and verifying the certificate, the AP includes encrypted WLAN provisioning information in a beacon. Because the WLAN provisioning information is encrypted with the STA's certificate, only the STA is able to decrypt the WLAN provisioning information. When the STA receives the beacon and decrypts the WLAN provisioning information, the STA then uses the WLAN provisioning information to complete an association (e.g., connection) to the WLAN via the AP. By extending the traditional WPS probe and beacon exchange to certificate secured WLAN provisioning, the manual configuration and security issues described above are overcome. Thus, large scale IoT deployments are efficiently enabled without compromising security. Additional details and examples are described below.

FIG. 1 is a block diagram of an example of an environment including a system for secure wireless association, according to an embodiment. The environment includes an IoT device 105 installed in a building with a network gateway 110 (e.g., AP). The IoT device 105, upon powering up for the first time in the context of the network accessed via the gateway 110, is arranged to transmit a probe request. The probe is generally designed to alert other devices using compatible radios of the IoT device's presence. The probe may also identify which services are desired, or may be provided, by the IoT device 105.

The probe request includes identification of a certificate (e.g., public-key certificate, digital certificate, etc.). In an example, the identification of the certificate is the certificate itself. In an example, the certificate identification is a URI. In an example, the probe request includes an additional value. This additional value is often called a nonce. In an example, the additional value is a randomly generated number. The additional value may increase security by adding a non-derivable and changing piece of information to each communication. The dynamic and unpredictable nature of the additional information make replay attacks difficult, as these attacks are likely to includes an old additional value, allowing valid participants an opportunity to identify the malicious communications.

The gateway 110 is arranged to retrieve the certificate from a certificate authority 115 using the certificate identification. In an example, the certificate ID identifies the IoT device 105 and the certificate authority 115 is preconfigured for the gateway 110. Here, the gateway 110 provides the certificate ID to the certificate authority 115 and receives the certificate in response. In an example, the certificate identification identifies the certificate authority 115 and the IoT device 105. Here, the gateway 110 contacts the certificate authority 115 using the URI of the certificate identification and retrieves the certificate in response. In an example, the certificate identification provides a URI to the certificate. The gateway 110 may retrieve the certificate at the URI and then contact the certificate authority 115, based on information within the certificate itself or the certificate identification, to verify the certificate.

The gateway 110, upon receiving and verifying the certificate, produces a beacon that includes provisioning information for the IoT device 105. The provisioning information will at least include a key to secure communications to the gateway 110. Additional information, such as radio frequency, channel, encoding, etc., may also be included in the provisioning information. The provision information is encrypted with the certificate. Generally, beacons are provided in response to probes. However, here, the beacon is modified to include the encrypted network provisioning information. The IoT device 105 is arranged to receive the beacon and decrypt the provisioning information. In an example, the beacon includes the additional value of the probe request encrypted with the certificate. The IoT device 105 is arranged to verify that the encrypted additional value matches the additional value included in the probe request. If there is no match, then the IoT device 105 is arranged to discard the provisioning information.

The IoT device 105 is arranged to associate with the AP using the key from the provisioning information. Association is the process by which a wireless device registers with, and often is scheduled by, a gateway. Once association is complete, the IoT device 105 may access additional IoT services 120 via the gateway 110. Techniques, such as Intel® Secure Device Onboarding, may then be used to onboard the IoT device 105 into an IoT service.

In an example, the gateway 110 is an AP arranged to operate in accordance with a standard from the IEEE 802.11 family of standards. In an example, the IoT device 105 is a STA arranged to operation in accordance with the IEEE 802.11 family of standards. In an example, the probe request and the beacon conform to a WPS family of standards. In an example, the identification of the certificate comprises thirty-two octets that are offset ten octets from the beginning of the probe request. In an example, an encrypted key comprises one hundred and twenty-eight octets offset eighteen octets from the beginning of the beacon.

Figure 2:
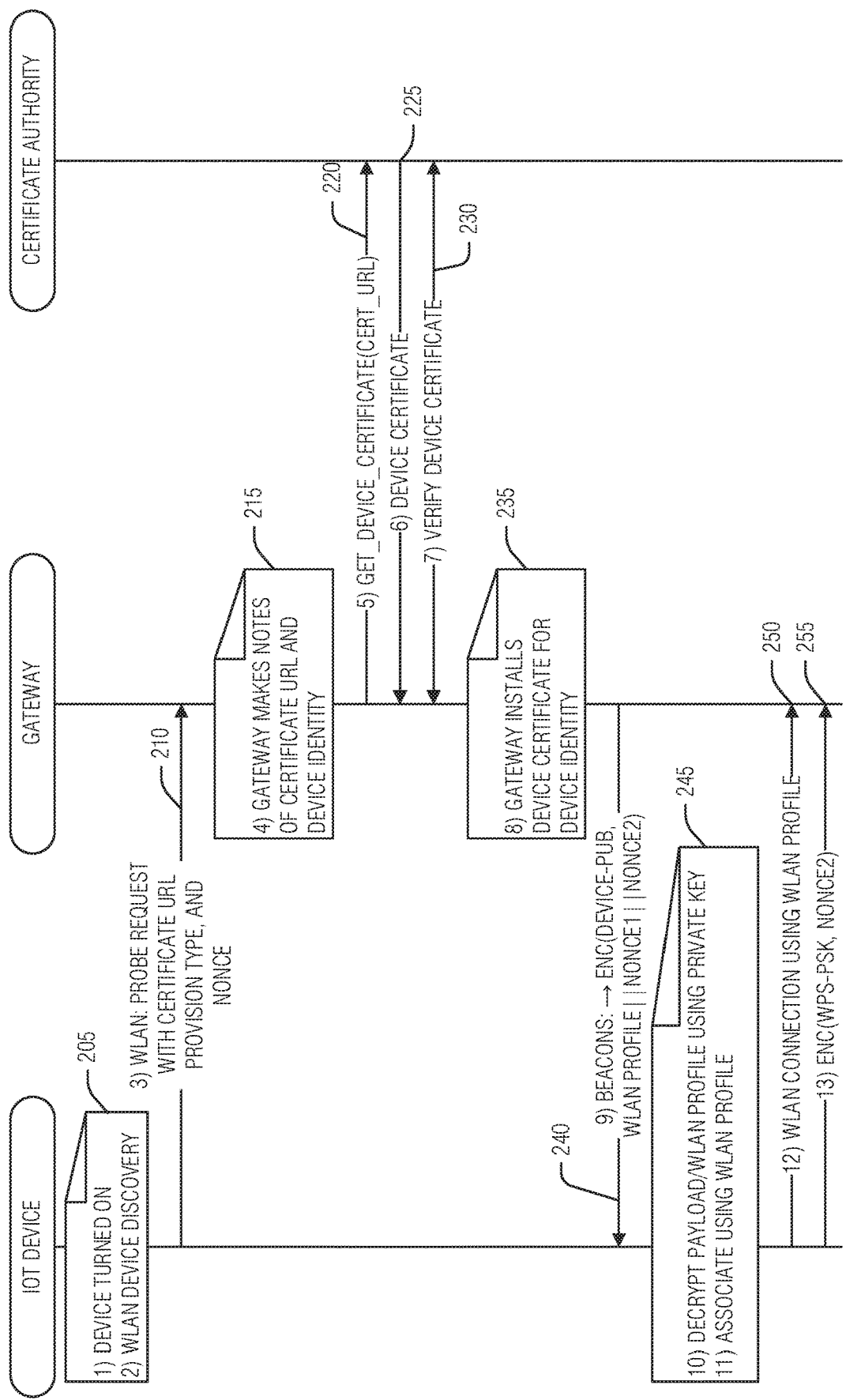
FIG. 2 illustrates an example of messaging between components in a system for secure wireless association, according to an embodiment.

FIG. 2 illustrates an example of messaging between components in a system for secure wireless association, according to an embodiment. When the IoT device is turned on, the IoT device performs WLAN discovery to find available gateways (activity 205). The IoT device may use a pre-configured policy to select a gateway or WLAN. A certificate URL for a certificate is sent from the IoT Device to the gateway as part of a discovery probe request (message 210). In an example, the URL includes a unique identifier for the IoT device. For example, the URL may take the form of "www.WiFiGatewayCertAuthority.com/DeviceID=xxxx," where "xxxx" is the unique identifier for the IoT device.

The gateway extracts the certificate URL and Device Identity (activity 215). Along with Certificate URL, an optional nonce (NONCE1), sent by the IoT device, may be extracted to facilitate further mutual authentication. The gateway, in response to this new request for provisioning, sends a message to the certificate authority, the message including a request for IoT device's security context and certificate (message 220). In response, the gateway obtains the device certificate for this certificate URL from the certificate authority (message 225). The gateway may then communicate with the certificate authority to verify the certificate (message 230). The verification may include verifying a chain of certificates all the way up to the root certificate, verifying that the root is a trusted certificate authority for the manufacturer of the IoT device, or verifying that the certificate is valid—e.g., the certificate has not expired or that the certificate was issued for the purpose for which it is used. The received certification may also include additional information about the IoT device such as device serial number, manufacturer ID, etc.

Once the gateway obtains the certificate for the IoT device, the gateway may install, or otherwise store the certificate in association with the IoT device's identity (activity 235). In an example, the gateway may produce a second nonce (NONCE2). The gateway encrypts a WLAN provisioning profile with, for example, a public key from the certificate of the IoT device. In an example, the NONCE2 is concatenated along with NONCE1 and other parameters in the message. The gateway then broadcasts its beacons with a WPS vendor extension that includes the encrypted information along with a MAC address of the IoT Device (message 240).

Upon receiving the beacons, the IoT device decrypts the WLAN profile and the NONCE2, and also verifies NONCE1 (activity 245). Using the decrypted WLAN profile, IoT Device may now connect to gateway (message 250). At the end of this phase, the device has all the credentials to start a regular WLAN connection and connect to the gateway core network. The IoT device, after the WLAN connection establishment, issues a simple Verify-Response message using NONCE2 as payload to complete mutual authentication between the IoT Device and the gateway (message 255).

FIG. 3 illustrates an example of a probe message 300, according to an embodiment. The probe message 300 is transmitted by a STA to discover APs from which network access may be obtained. The probe message 300 generally conforms to a WPS family of standards. The probe message 300 begins with two octets (e.g., two bytes or sixteen bits) to identify a WPS implementer vendor, two octets to indicate the length of the probe message 300, two octets to indicate the purpose of the probe (e.g., Code 1: "need provisioning"; Code 2: "Provision Response"), and four octets to identify the device (STA) manufacturer (e.g., the OUI is a standard part of a MAC address assigned to vendors). The probe message 300 also includes thirty-two octets to encode a URI. The URI may encode an identifier for the STA from which a certificate may be retrieved, it may be a URI of the certificate itself, or a URI to a certificate authority. The probe message may also contain an additional value, commonly called a nonce, in the last two octets. The nonce is generally randomly generated and used to version exchanges to prevent replay attacks.

FIG. 4 illustrates an example of a beacon message 400, according to an embodiment. The beacon message 400 conforms to the WPS family of standards and is transmitted by an AP. Generally, beacons are not specific to a STA, however, by encrypting WLAN provisioning (e.g., encryption key, channel, etc.) using a STA specific certificate, the beacon message 400 conveys STA specific information. The first four fields of the beacon message 400 generally coincide with the first four fields of the probe message 300. The last three fields are a six octet STA identifier (ID), two octets to hold an encrypted version of the nonce provided in the probe message 300, and one hundred and twenty-eight octets to hold the WPS profile for the STA, encrypted with the STA's certificate. The STA may decrypt the WPS profile using its certificate, and then associate with the AP using the WPS profile.

Figure 5:
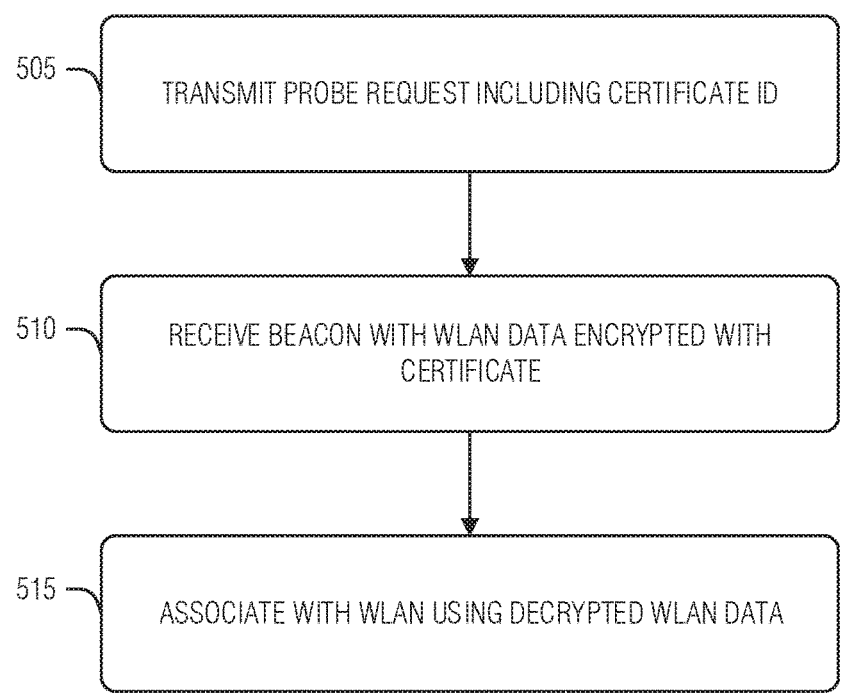
FIG. 5 illustrates a flow diagram of an example of a method for secure wireless association from a station, according to an embodiment.

FIG. 5 illustrates a flow diagram of an example of a method 500 for secure wireless association from a STA, according to an embodiment. The STA is a device attempting to join a WLAN via an AP. The operations of the method 500 are implemented in electronic hardware, such as that described above or below (e.g., processing circuitry).

At operation 505, a probe request is transmitted. Here, the probe request includes identification of a certificate. In an example, the identification of the certificate in the probe request is a URI to obtain and verify the certificate from a certificate authority. In an example, the probe request also includes an additional value. In an example, the additional value is a randomly generated number.

At operation 510, a beacon is received from an AP. Here, the beacon includes a key that is encrypted with the certificate. In an example, the beacon includes the additional value encrypted with the certificate.

At operation 515, the STA associates with the AP using the key.

In an example, the AP operates in accordance with an IEEE 802.11 family of standards. In an example, the probe request and the beacon conform to a WPS family of standards. In an example, the identification of the certificate comprises thirty-two octets offset ten octets from the beginning of the probe request. In an example, the key encrypted with the certificate comprises one hundred and twenty-eight octets offset eighteen octets from the beginning of the beacon.

Figure 6:
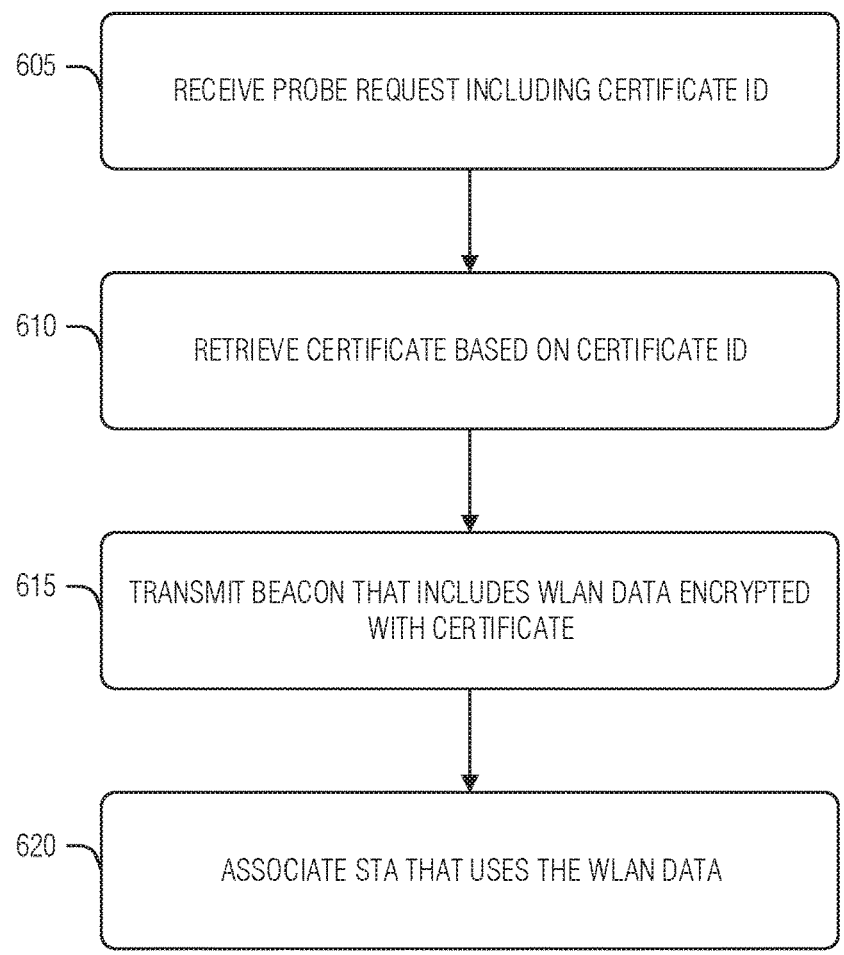
FIG. 6 illustrates a flow diagram of an example of a method for secure wireless association from an access point, according to an embodiment.

FIG. 6 illustrates a flow diagram of an example of a method 600 for secure wireless association from an AP, according to an embodiment. The AP provides an interface between wireless client devices (e.g., STAs) and the greater network, such as a wired network. The AP may be referred to as a gateway to the greater network. The operations of the method 600 are implemented in electronic hardware, such as that described above or below (e.g., processing circuitry).

At operation 605, a probe request that includes identification of a certificate is received. In an example, the probe request includes an additional value. In an example, the additional value is a randomly generated number. In an example, the identification of the certificate is a URI.

At operation 610, the certificate is retrieved from a certificate authority using the certificate identification.

At operation 615, a beacon that includes a key encrypted with the certificate is transmitted. In an example, the beacon includes the additional value encrypted with the certificate.

At operation 620, STA that uses the key is associated to the WLAN. In an example, the STA operates in accordance with an IEEE 802.11 family of standards. In an example, the probe request and the beacon conform to a WPS family of standards. In an example, the identification of the certificate comprises thirty-two octets offset ten octets from the beginning of the probe request. In an example, the key encrypted with the certificate comprises one hundred and twenty-eight octets offset eighteen octets from the beginning of the beacon.

The various systems and techniques for secure wireless association described above offer numerous advantages over previous attempts to solve this issue in the IoT context. These advantages may include single-click onboarding to the wireless network for headless devices via a protocol to transfer and verify the public key for IoT Devices used to provision and verify the device public key. Further, mutual authentication between IoT device and gateway is enabled along with secure transmission of security credentials for the WLAN. Thus, onboarded devices may access the WLAN to continue IoT provisioning.

Figure 7:
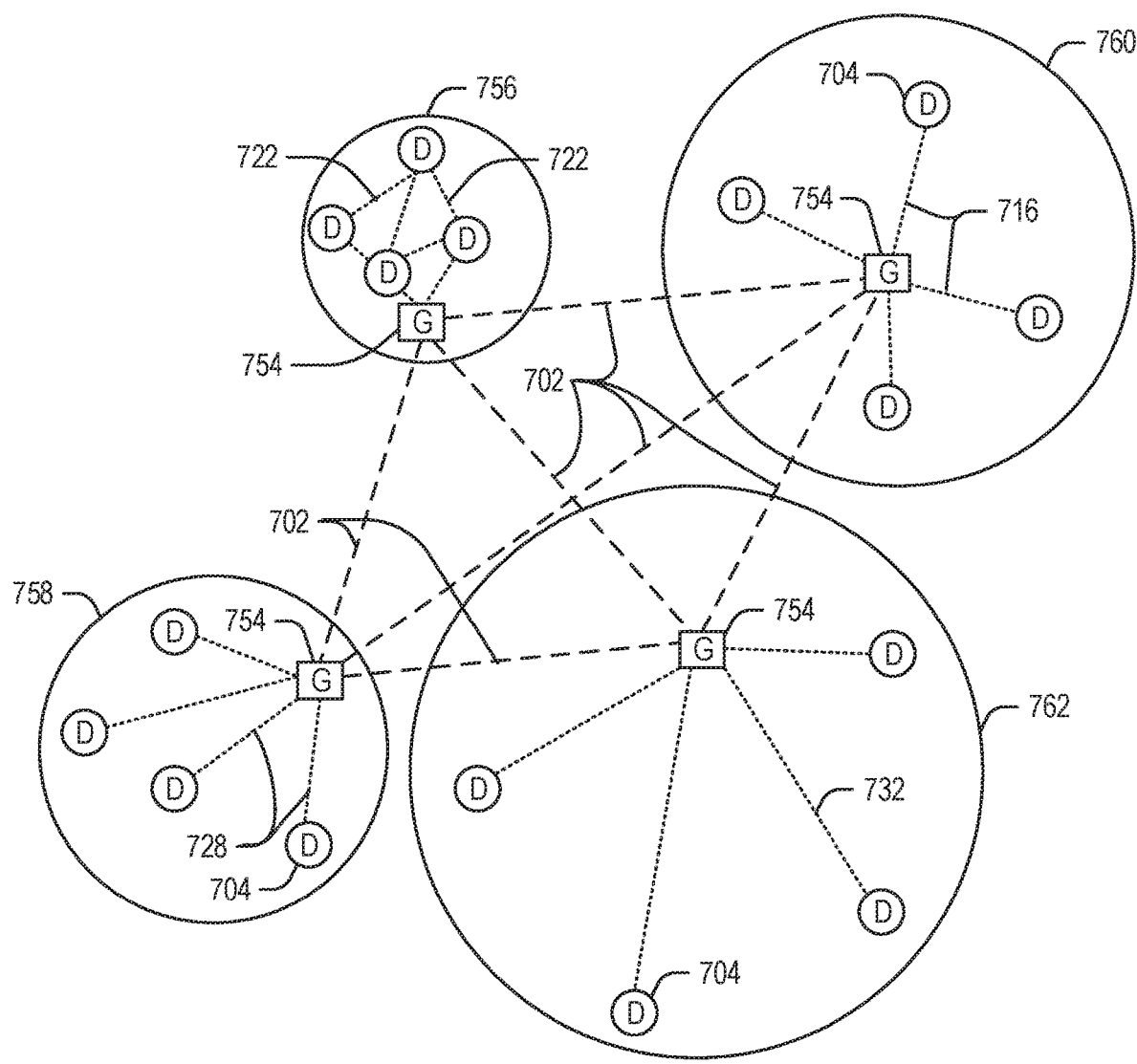
FIG. 7 illustrates an example domain topology for respective Internet of Things networks coupled through links to respective gateways, according to an embodiment.

FIG. 7 illustrates an example domain topology for respective Internet of Things (IoT) networks coupled through links to respective gateways. The Internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited n memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 8:
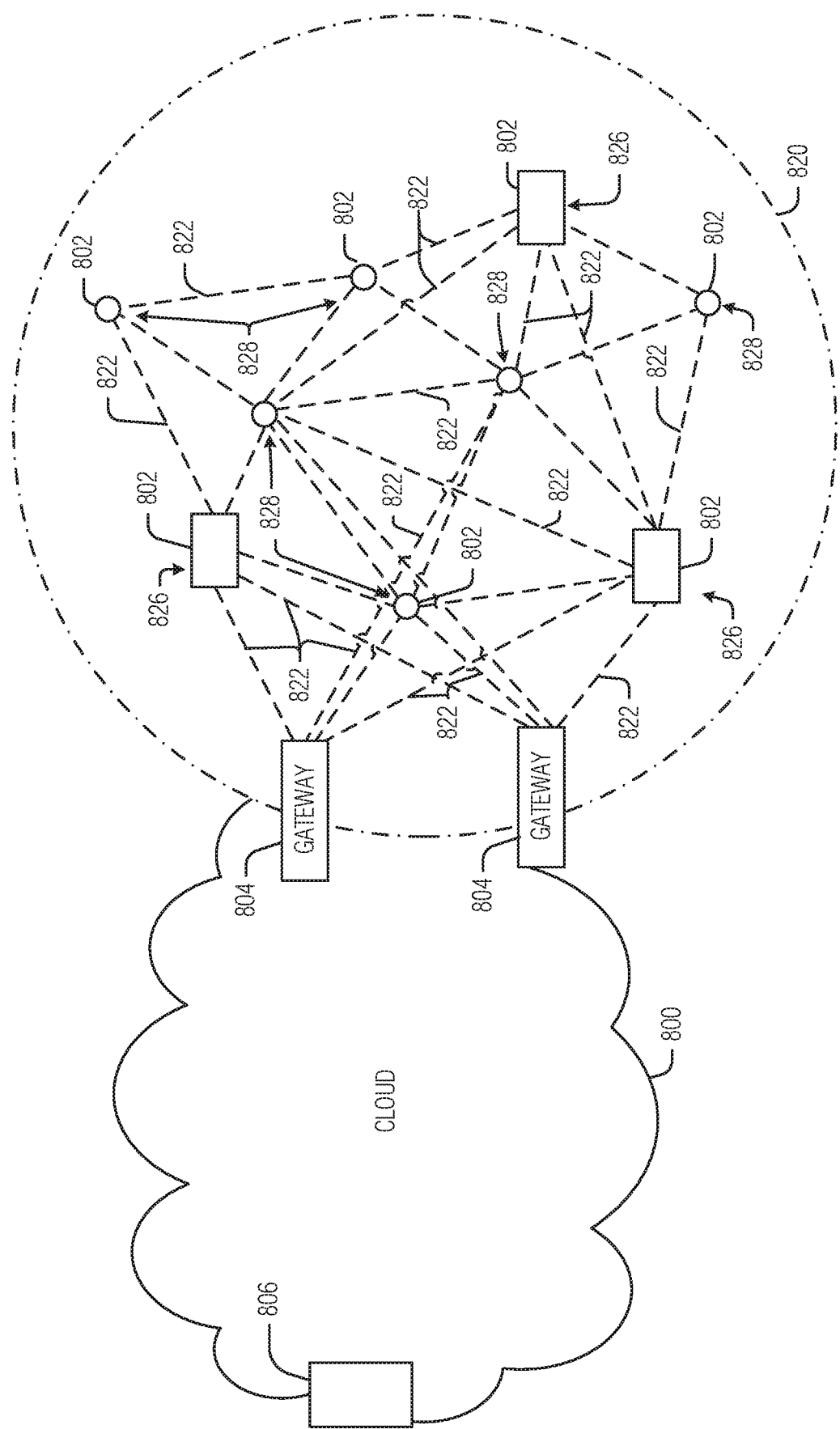
FIG. 8 illustrates a cloud computing network in communication with a mesh network of Internet of Things devices operating as a Fog device at the edge of the cloud computing network, according to an embodiment.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time, or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 7 and 8, present a number of new challenges in a heterogeneous network of connectivity comprising a combination of wired and wireless technologies.

FIG. 7 specifically provides a simplified drawing of a domain topology that may be used for a number of Internet of Things (IoT) networks comprising IoT devices 704, with the IoT networks 756, 758, 760, 762, coupled through backbone links 702 to respective gateways 754. For example, a number of IoT devices 704 may communicate with a gateway 754, and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 704 and gateways 754, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.11 (Wi-Fi®) links 728, a cellular network 760 used to communicate with IoT devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as Fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and traceability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies. This is discussed further with respect to the communication environment and hardware of an IoT processing device depicted in FIGS. 9 and 10.

Finally, clusters of IoT devices may be equipped to communicate with other IoT devices as well as with a cloud network. This may allow the IoT devices to form an ad-hoc network between the devices, allowing them to function as a single device, which may be termed a Fog device. This configuration is discussed further with respect to FIG. 8 below.

FIG. 8 illustrates a cloud computing network in communication with a mesh network of IoT devices (devices 802) operating as a Fog device at the edge of the cloud computing network. The mesh network of IoT devices may be termed a Fog 820, operating at the edge of the cloud 800. To simplify the diagram, not every IoT device 802 is labeled.

The Fog 820 may be considered to be a massively interconnected network wherein a number of IoT devices 802 are in communications with each other, for example, by radio links 822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 802 are shown in this example, gateways 804, data aggregators 826, and sensors 828, although any combinations of IoT devices 802 and functionality may be used. The gateways 804 may be edge devices that provide communications between the cloud 800 and the Fog 820, and may also provide the backend process function for data obtained from sensors 828, such as motion data, flow data, temperature data, and the like. The data aggregators 826 may collect data from any number of the sensors 828, and perform the back end processing function for the analysis. The results, raw data, or both may be passed along to the cloud 800 through the gateways 804. The sensors 828 may be full IoT devices 802, for example, capable of both collecting data and processing the data. In some cases, the sensors 828 may be more limited in functionality, for example, collecting the data and allowing the data aggregators 826 or gateways 804 to process the data.

Communications from any IoT device 802 may be passed along a convenient path (e.g., a most convenient path) between any of the IoT devices 802 to reach the gateways 804. In these networks, the number of interconnections provide substantial redundancy, allowing communications to be maintained, even with the loss of a number of IoT devices 802. Further, the use of a mesh network may allow IoT devices 802 that are very low power or located at a distance from infrastructure to be used, as the range to connect to another IoT device 802 may be much less than the range to connect to the gateways 804.

The Fog 820 provided from these IoT devices 802 may be presented to devices in the cloud 800, such as a server 806, as a single device located at the edge of the cloud 800, e.g., a Fog device. In this example, the alerts coming from the Fog device may be sent without being identified as coining from a specific IoT device 802 within the Fog 820. In this fashion, the Fog 820 may be considered a distributed platform that provides computing and storage resources to perform processing or data-intensive tasks such as data analytics, data aggregation, and machine-learning, among others.

In some examples, the IoT devices 802 may be configured using an imperative programming style, e.g., with each IoT device 802 having a specific function and communication partners. However, the IoT devices 802 forming the Fog device may be configured in a declarative programming style, allowing the IoT devices 802 to reconfigure their operations and communications, such as to determine needed resources in response to conditions, queries, and device failures. As an example, a query from a user located at a server 806 about the operations of a subset of equipment monitored by the IoT devices 802 may result in the Fog 820 device selecting the IoT devices 802, such as particular sensors 828, needed to answer the query. The data from these sensors 828 may then be aggregated and analyzed by any combination of the sensors 828, data aggregators 826, or gateways 804, before being sent on by the Fog 820 device to the server 806 to answer the query. In this example, IoT devices 802 in the Fog 820 may select the sensors 828 used based on the query, such as adding data from flow sensors or temperature sensors. Further, if some of the IoT devices 802 are not operational, other IoT devices 802 in the Fog 820 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 9:
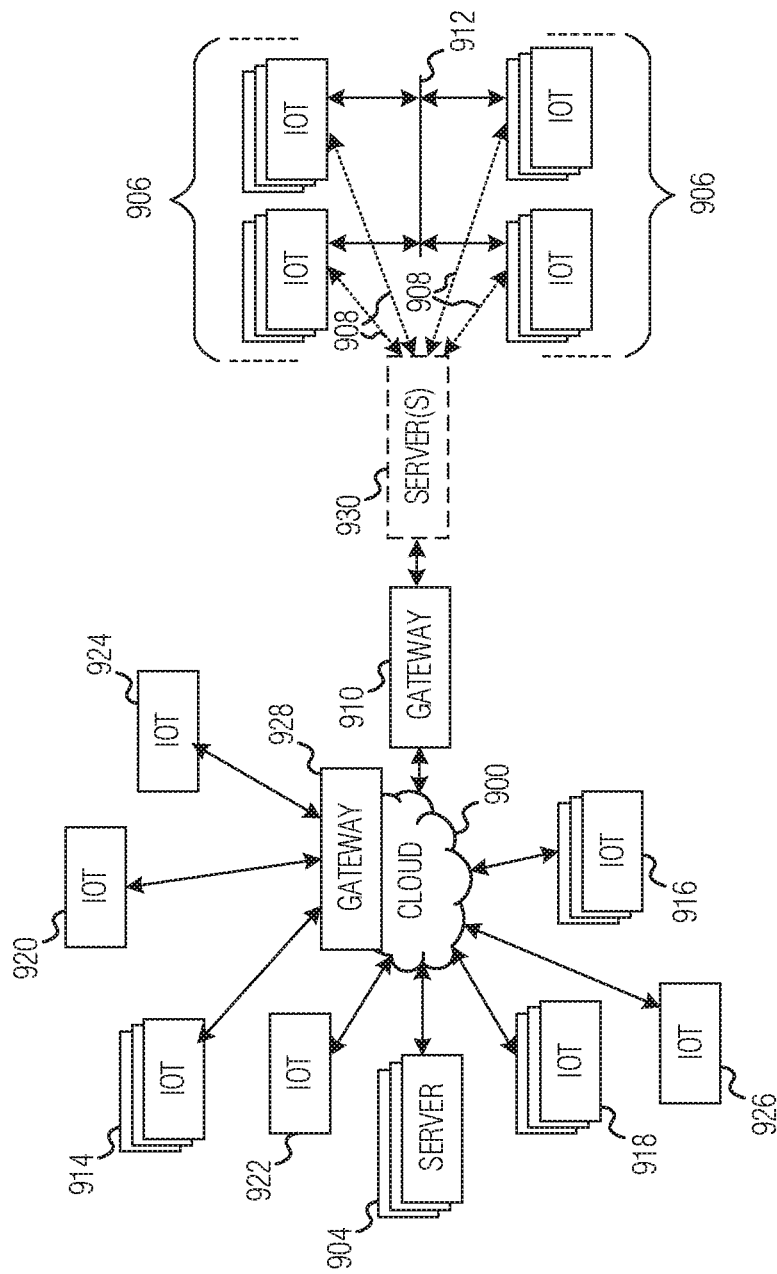
FIG. 9 illustrates a drawing of a cloud computing network, or cloud, in communication with a number of Internet of Things devices, according to an embodiment.

FIG. 9 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or Fog implementation among a local area network. Further, the gateway 928 that is depicted may operate in a cloud-to-gateway-to-many edge devices configuration, such as with the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT Fog device or system (not shown, but depicted in FIG. 8), or a combination therein. The groups of IoT devices may be deployed in various residential, commercial, and industrial settings (including in both private or public environments).

As may be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a Fog device or system (e.g., as described above with reference to FIG. 8).

Figure 10:
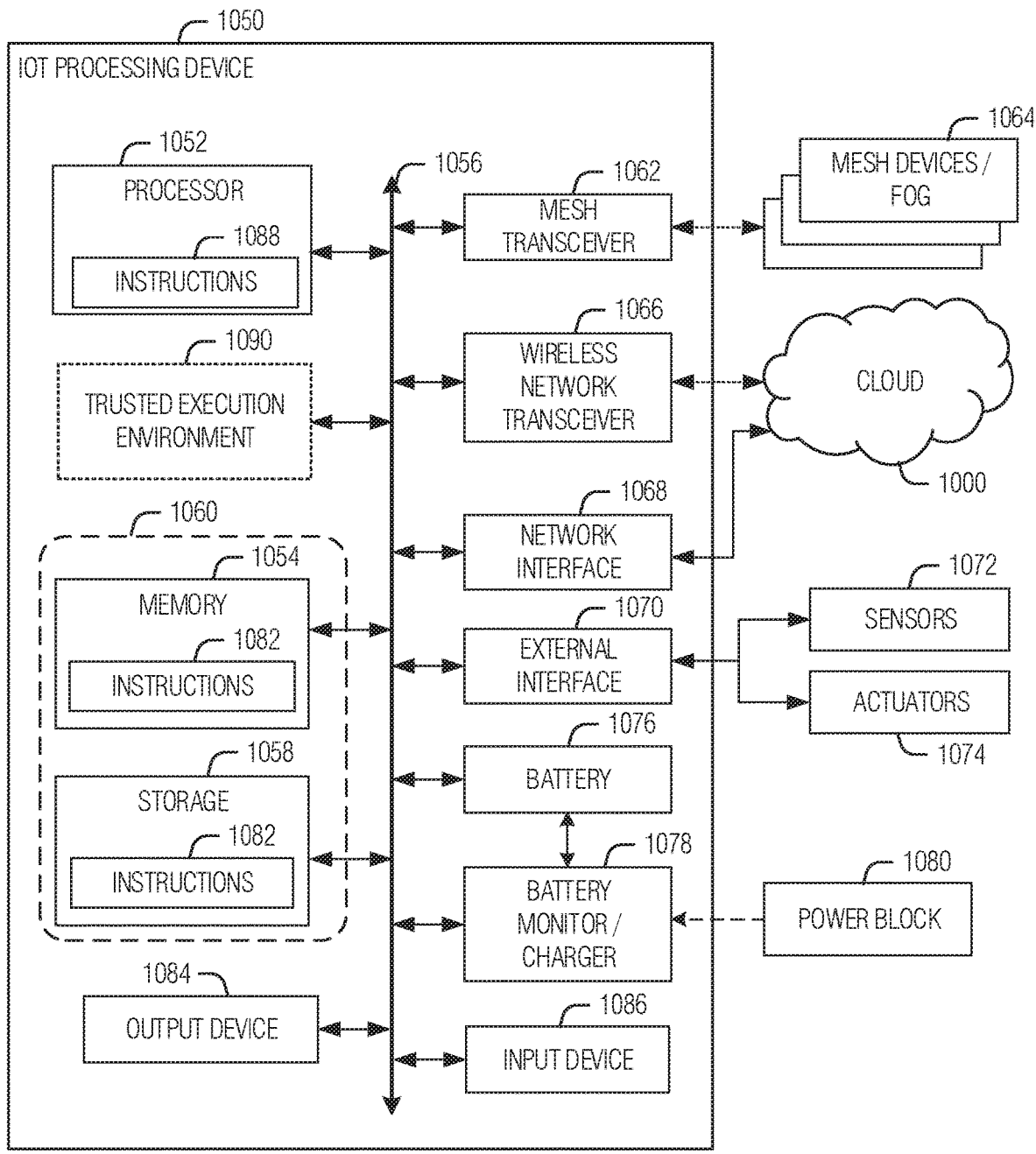
FIG. 10 is a block diagram of an example of components that may be present in an Internet of Things device, according to an embodiment.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric, pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 8 or may include specific storage units such as optical disks, flash drives, or any number of other hardware devices. The non-transitory, machine readable medium 1060 may further include, provide, or invoke instructions 1088 to direct the processor 1052 to perform a specific sequence or flow of actions, for example, as described with respect to the flowchart(s) and block diagram(s) of operations and functionality depicted above.

In an example, the instructions 1088 on the processor 1052 (separately, or in combination with the instructions 1088 of the machine readable medium 1060) may configure execution or operation of a trusted execution environment (TEE) 1090. In an example, the TEE 1090 operates as a protected area accessible to the processor 1052 to enable secure access to data and secure execution of instructions. Various implementations of the TEE 1090, and an accompanying secure area in the processor 1052 or the memory 1054 may be provided, for instance, through use of Intel® Software Guard Extensions (SGX) or ARM®, TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 11:
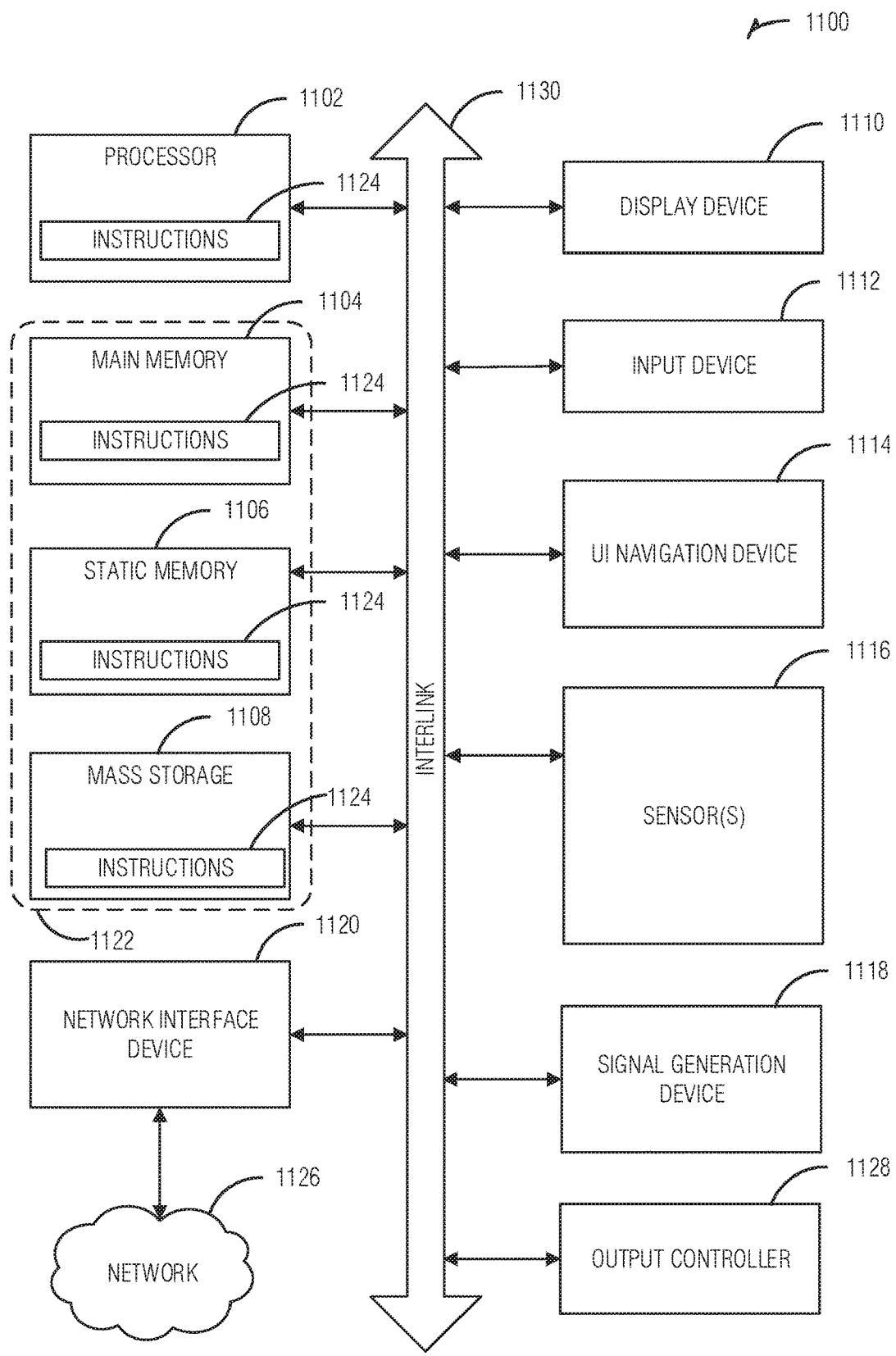
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. Examples, as described herein, may include, or may operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may he used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and 111 navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

Additional Notes & Examples

Example 1 is a device, of a station, for secure wireless network association, the device comprising: a transceiver to: initiate transmission of a probe request for the wireless network, the probe request including identification of a certificate held by the station; receive a beacon from an access point (AP), the beacon including a key encrypted with the certificate; and associate with the AP using the key; and a decoder to unencrypt the key with the certificate.

In Example 2, the subject matter of Example 1 includes, wherein the probe request includes an additional value.

In Example 3, the subject matter of Example 2 includes, wherein the additional value is a randomly generated number.

In Example 4, the subject matter of Examples 2-3 includes, wherein the beacon includes the additional value encrypted with the certificate.

In Example 5, the subject matter of Examples 1-4 includes, wherein the identification of the certificate is a uniform resource identifier (URI) to obtain and verify the certificate from a certificate authority.

In Example 6, the subject matter of Examples 1-5 includes, wherein the AP operates in accordance with an IEEE 802.11 family of standards.

In Example 7, the subject matter of Example 6 includes, wherein the probe request and the beacon conform to a protected setup (WPS) family of standards.

In Example 8, the subject matter of Example 7 includes, wherein the identification of the certificate comprises thirty-two octets offset ten octets from the beginning of the probe request.

In Example 9, the subject matter of Examples 7-8 includes, wherein the key encrypted with the certificate comprises one hundred and twenty-eight octets offset eighteen octets from the beginning of the beacon.

Example 10 is a method for secure wireless network association, the method comprising: transmitting a probe request for the wireless network, the probe request including identification of a certificate; receiving a beacon from an access point (AP), the beacon including a key encrypted with the certificate; and associating with the AP using the key.

In Example 11, the subject matter of Example 10 includes, wherein the probe request includes an additional value.

In Example 12, the subject matter of Example 11 includes, wherein the additional value is a randomly generated number.

In Example 13, the subject matter of Examples 11-12 includes, wherein the beacon includes the additional value encrypted with the certificate.

In Example 14, the subject matter of Examples 10-13 includes, wherein the identification of the certificate is a uniform resource identifier (URI) to obtain and verify the certificate from a certificate authority.

In Example 15, the subject matter of Examples 10-14 includes, wherein the AP operates in accordance with an IEEE 802.11 family of standards.

In Example 16, the subject matter of Example 15 includes, wherein the probe request and the beacon conform to a protected setup (WPS) family of standards.

In Example 17, the subject matter of Example 16 includes, wherein the identification of the certificate comprises thirty-two octets offset ten octets from the beginning of the probe request.

In Example 18, the subject matter of Examples 16-17 includes, wherein the key encrypted with the certificate comprises one hundred and twenty-eight octets offset eighteen octets from the beginning of the beacon.

Example 19 is at least one machine readable medium including instructions for secure wireless network association, the instructions, when executed by a station, cause the station to perform operations comprising: transmitting a probe request for the wireless network, the probe request including identification of a certificate; receiving a beacon from an access point (AP), the beacon including a key encrypted with the certificate; and associating with the AP using the key.

In Example 20, the subject matter of Example 19 includes, wherein the probe request includes an additional value.

In Example 21, the subject matter of Example 20 includes, wherein the additional value is a randomly generated number.

In Example 22, the subject matter of Examples 20-21 includes, wherein the beacon includes the additional value encrypted with the certificate.

In Example 23, the subject matter of Examples 19-22 includes, wherein the identification of the certificate is a uniform resource identifier (URI) to obtain and verify the certificate from a certificate authority.

In Example 24, the subject matter of Examples 19-23 includes, wherein the AP operates in accordance with an IEEE 802.11 family of standards.

In Example 25, the subject matter of Example 24 includes, wherein the probe request and the beacon conform to a protected setup (WPS) family of standards.

In Example 26, the subject matter of Example 25 includes, wherein the identification of the certificate comprises thirty-two octets offset ten octets from the beginning of the probe request.

In Example 27, the subject matter of Examples 25-26 includes, wherein the key encrypted with the certificate comprises one hundred and twenty-eight octets offset eighteen octets from the beginning of the beacon.

Example 28 is a system for secure wireless network association, the system comprising: means for transmitting a probe request for the wireless network, the probe request including identification of a certificate; means for receiving a beacon from an access point (AP), the beacon including a key encrypted with the certificate; and means for associating with the AP using the key.

In Example 29, the subject matter of Example 28 includes, wherein the probe request includes an additional value.

In Example 30, the subject matter of Example 29 includes, wherein the additional value is a randomly generated number.

In Example 31, the subject matter of Examples 29-30 includes, wherein the beacon includes the additional value encrypted with the certificate.

In Example 32, the subject matter of Examples 28-31 includes, wherein the identification of the certificate is a uniform resource identifier (URI) to obtain and verify the certificate from a certificate authority.

In Example 33, the subject matter of Examples 28-32 includes, wherein the AP operates in accordance with an IEEE 802.11 family of standards.

In Example 34, the subject matter of Example 33 includes, wherein the probe request and the beacon conform to a protected setup (WPS) family of standards.

In Example 35, the subject matter of Example 34 includes, wherein the identification of the certificate comprises thirty-two octets offset ten octets from the beginning of the probe request.

In Example 36, the subject matter of Examples 34-35 includes, wherein the key encrypted with the certificate comprises one hundred and twenty-eight octets offset eighteen octets from the beginning of the beacon.

Example 37 is a device, of an access point, for secure wireless network association, the device comprising: a transceiver to: receive a probe request that includes, identification of a certificate; retrieve the certificate from a certificate authority using the certificate identification; and transmit a beacon that includes a key encrypted with the certificate; and processing circuitry to associate a station (STA) that uses the key.

In Example 38, the subject matter of Example 37 includes, wherein the probe request includes an additional value.

In Example 39, the subject matter of Example 38 includes, wherein the additional value is a randomly generated number.

In Example 40, the subject matter of Examples 38-39 includes, wherein the beacon includes the additional value encrypted with the certificate.

In Example 41, the subject matter of Examples 37-40 includes, wherein the identification of the certificate is a uniform resource identifier (URI).

In Example 42, the subject matter of Examples 37-41 includes, wherein the STA operates in accordance with an IEEE 802.11 family of standards.

In Example 43, the subject matter of Example 42 includes, wherein the probe request and the beacon conform to a protected setup (WPS) family of standards.

In Example 44, the subject matter of Example 43 includes, wherein the identification of the certificate comprises thirty-two octets offset ten octets from the beginning of the probe request.

In Example 45, the subject matter of Examples 43-44 includes, wherein the key encrypted with the certificate comprises one hundred and twenty-eight octets offset eighteen octets from the beginning of the beacon.

Example 46 is a method for secure wireless network association, the method comprising: receiving a probe request that includes, identification of a certificate; retrieving the certificate from a certificate authority using the certificate identification; transmitting a beacon that includes a key encrypted with the certificate; and associating a station (STA) that uses the key.

In Example 47, the subject matter of Example 46 includes, wherein the probe request includes an additional value.

In Example 48, the subject matter of Example 47 includes, wherein the additional value is a randomly generated number.

In Example 49, the subject matter of Examples 47-48 includes, wherein the beacon includes the additional value encrypted with the certificate.

In Example 50, the subject matter of Examples 46-49 includes, wherein the identification of the certificate is a uniform resource identifier (URI).

In Example 51, the subject matter of Examples 46-50 includes, wherein the STA operates in accordance with an IEEE 802.11 family of standards.

In Example 52, the subject matter of Example 51 includes, wherein the probe request and the beacon conform to a protected setup (WPS) family of standards.

In Example 53, the subject matter of Example 52 includes, wherein the identification of the certificate comprises thirty-two octets offset ten octets from the beginning of the probe request.

In Example 54, the subject matter of Examples 52-53 includes, wherein the key encrypted with the certificate comprises one hundred and twenty-eight octets offset eighteen octets from the beginning of the beacon.

Example 55 is at least one machine readable medium including instructions for secure wireless network association, the instructions, when executed by an access point, cause the access point to perform operations comprising: receiving a probe request that includes, identification of a certificate; retrieving the certificate from a certificate authority using the certificate identification; transmitting a beacon that includes a key encrypted with the certificate; and associating a station (STA) that uses the key.

In Example 56, the subject matter of Example 55 includes, wherein the probe request includes an additional value.

In Example 57, the subject matter of Example 56 includes, wherein the additional value is a randomly generated number.

In Example 58, the subject matter of Examples 56-57 includes, wherein the beacon includes the additional value encrypted with the certificate.

In Example 59, the subject matter of Examples 55-58 includes, wherein the identification of the certificate is a uniform resource identifier (URI).

In Example 60, the subject matter of Examples 55-59 includes, wherein the STA operates in accordance with an IEEE 802.11 family of standards.

In Example 61, the subject matter of Example 60 includes, wherein the probe request and the beacon conform to a protected setup (WPS) family of standards.

In Example 62, the subject matter of Example 61 includes, wherein the identification of the certificate comprises thirty-two octets offset ten octets from the beginning of the probe request.

In Example 63, the subject matter of Examples 61-62 includes, wherein the key encrypted with the certificate comprises one hundred and twenty-eight octets offset eighteen octets from the beginning of the beacon.

Example 64 is a system for secure wireless network association, the system comprising: means for receiving a probe request that includes, identification of a certificate; means for retrieving the certificate from a certificate authority using the certificate identification; means for transmitting a beacon that includes a key encrypted with the certificate; and means for associating a station (STA) that uses the key.

In Example 65, the subject matter of Example 64 includes, wherein the probe request includes an additional value.

In Example 66, the subject matter of Example 65 includes, wherein the additional value is a randomly generated number.

In Example 67, the subject matter of Examples 65-66 includes, wherein the beacon includes the additional value encrypted with the certificate.

In Example 68, the subject matter of Examples 64-67 includes, wherein the identification of the certificate is a uniform resource identifier (URI).

In Example 69, the subject matter of Examples 64-68 includes, wherein the STA operates in accordance with an IEEE 802.11 family of standards.

In Example 70, the subject matter of Example 69 includes, wherein the probe request and the beacon conform to a protected setup (WPS) family of standards.

In Example 71, the subject matter of Example 70 includes, wherein the identification of the certificate comprises thirty-two octets offset ten octets from the beginning of the probe request.

In Example 72, the subject matter of Examples 70-71 includes, wherein the key encrypted with the certificate comprises one hundred and twenty-eight octets offset eighteen octets from the beginning of the beacon.

Example 73 is at least one machine-readable medium including instructions that, when executed by processing circuitry, cause the processing circuitry to perform operations to implement of any of Examples 1-72.

Example 74 is an apparatus comprising means to implement of any of Examples 1-72.

Example 75 is a system to implement of any of Examples 1-72.

Example 76 is a method to implement of any of Examples 1-72.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device, of a station, for secure wireless network association, the device comprising:
a transceiver to:
initiate transmission of a probe request for the wireless network, the probe request including identification of a certificate held by the station;
receive a beacon from an access point (AP), the beacon including a key encrypted with the certificate, the key being encrypted with the certificate by the AP in response to receipt of the probe request including the identification of the certificate, wherein the AP operates in accordance with an IEEE 802.11 family of standards, wherein the probe request and the beacon conform to a protected setup (WPS) family of standards, and wherein the identification of the certificate comprises at least one of:
thirty-two octets offset ten octets from the beginning of the probe request; or
one hundred and twenty-eight octets offset eighteen octets from the beginning of the beacon; and
associate with the AP using the key; and
a decoder to unencrypt the key with the certificate.

2. The device of claim 1, wherein the probe request includes an additional value.

3. The device of claim 2, wherein the additional value is a randomly generated number.

4. The device of claim 2, wherein the beacon includes the additional value encrypted with the certificate.

5. The device of claim 1, wherein the identification of the certificate is a uniform resource identifier (URI) to obtain and verify the certificate from a certificate authority.

6. At least one machine readable medium including instructions for secure wireless network association, the instructions, when executed by a station, cause the station to perform operations comprising:

transmitting a probe request for the wireless network, the probe request including identification of a certificate held by the station:

receiving a beacon from an access point (AP), the beacon including a key encrypted with the certificate, the key being encrypted with the certificate by the AP in response to receipt of the probe request including the identification of the certificate, wherein the AP operates in accordance with an IEEE 802.11 family of standards, wherein the probe request and the beacon conform to a protected setup (WPS) family of standards, and wherein the identification of the certificate comprises at least one of:

thirty-two octets offset ten octets from the beginning of the probe request; or one hundred and twenty-eight octets offset eighteen octets from the beginning of the beacon; and associating with the AP using the key.

7. The at least one machine readable medium of claim 6, wherein the probe request includes an additional value.

8. The at least one machine readable medium of claim 7, wherein the additional value is a randomly generated number.

9. The at least one machine readable medium of claim 7, wherein the beacon includes the additional value encrypted with the certificate.

10. The at least one machine readable medium of claim 6, wherein the identification of the certificate is a uniform resource identifier (URI) to obtain and verify the certificate from a certificate authority.

11. A device, of an access point, for secure wireless network association, the device comprising:

a transceiver to:

receive a probe request that includes identification of a certificate held by a station (STA) sending the probe request, wherein the STA operates in accordance with an IEEE 802.11 family of standards, wherein the probe request conforms to a protected setup (WPS) family of standards, and wherein the identification of the certificate comprises at least one of:

thirty-two octets offset ten octets from the beginning of the probe request; or one hundred and twenty-eight octets offset eighteen octets from the beginning of the beacon;

retrieve the certificate from a certificate authority using the certificate identification; and transmit a beacon that includes a key encrypted with the certificate; and processing circuitry to associate the STA that uses the key.

12. The device of claim 11, wherein the probe request includes an additional value.

13. The device of claim 12, wherein the additional value is a randomly generated number.

14. The device of claim 12, wherein the beacon includes the additional value encrypted with the certificate.

15. The device of claim 11, wherein the identification of the certificate is a uniform resource identifier (URI).

16. The device of claim 11, wherein the beacon conforms to a protected setup (WPS) family of standards.

\* \* \* \* \*

UNITED STATES PATENT AND TRADEMARK OFFICE
CERTIFICATE OF CORRECTION

PATENT NO.         : 10,958,446 B2
APPLICATION NO.    : 15/868198
DATED              : March 23, 2021
INVENTOR(S)        : Singhi et al.

Page 1 of 1

It is certified that error appears in the above-identified patent and that said Letters Patent is hereby corrected as shown below:

In the Claims

In Column 25, Line 5, in Claim 6, delete "station:" and insert --station;-- therefor Signed and Sealed this
Sixth Day of July, 2021

Drew Hirshfeld
*Performing the Functions and Duties of the
Under Secretary of Commerce for Intellectual Property and
Director of the United States Patent and Trademark Office*